(12) United States Patent
Sobalvarro et al.

(10) Patent No.: US 10,607,238 B2
(45) Date of Patent: *Mar. 31, 2020

(54) APPARATUS, SYSTEM AND METHOD FOR CONSUMER TRACKING CONSUMER PRODUCT INTEREST USING MOBILE DEVICES

(71) Applicant: AVERY DENNISON CORPORATION, Mentor, OH (US)

(72) Inventors: Patrick Sobalvarro, Harvard, MA (US); Michael Redd, Medford, MA (US); Michaelyn Molly McCarthy, Plano, TX (US); Micah Waldman, Framingham, MA (US); Rafael Maya, Chestnut Hill, MA (US)

(73) Assignee: AVERY DENNISON CORPORATION, Mentor, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/824,813

(22) Filed: Nov. 28, 2017

(65) Prior Publication Data

US 2018/0089700 A1    Mar. 29, 2018

Related U.S. Application Data

(62) Division of application No. 13/600,692, filed on Aug. 31, 2012, now Pat. No. 9,858,583.

(Continued)

(51) Int. Cl.
*G06Q 30/02* (2012.01)
*H04L 29/08* (2006.01)
(Continued)

(52) U.S. Cl.
CPC ............. *G06Q 30/02* (2013.01); *H04L 67/34* (2013.01); *H04M 1/7253* (2013.01); *H04W 4/50* (2018.02); *H04W 4/80* (2018.02)

(58) Field of Classification Search
CPC .... G06Q 30/02; G06Q 20/32; G06Q 20/3278; G06Q 20/382; G06Q 20/388;
(Continued)

(56) References Cited

U.S. PATENT DOCUMENTS 1,331,136 A    2/1920 Woodjard
5,083,111 A    1/1992 Drucker et al.
(Continued)

FOREIGN PATENT DOCUMENTS

BR    PI0611910    2/2011
CN    101253750    8/2008
(Continued)

OTHER PUBLICATIONS

"AN1445: Antenna design guide for MFRC52x, PN51x and PN53x, Rev.1.2, Document AN1445_12", NXP B.V., (Oct. 11, 2010), 65 pgs.

(Continued)

*Primary Examiner* — Golam Sorowar
(74) *Attorney, Agent, or Firm* — Avery Dennison Retail Information Services, LLC (57) ABSTRACT

According to at least one exemplary embodiment, methods, systems and apparatuses for communication may be shown and described. These can include the use of near field communications (NFC), for example a NFC RFID tag, label or inlay that is able to communicate with a NFC-enabled device, for example a mobile or smart phone or other portable device having a scanner or reader. Further, any number of NFC RFID tags may be associated with any desired products or services, allowing NFC-enabled devices to read or scan the NFC RFID tags and access data or information provided by the NFC RFID tags, which may be associated with products or services to which the NFC RFID tags are coupled to.

10 Claims, 5 Drawing Sheets

Related U.S. Application Data (60) Provisional application No. 61/530,387, filed on Sep. 1, 2011.

(51) Int. Cl.
    *H04M 1/725* (2006.01)
    *H04W 4/50* (2018.01)
    *H04W 4/80* (2018.01)

(58) Field of Classification Search
    CPC .... G06Q 30/00; G06Q 20/0457; G06Q 20/20;
    H04L 63/0492; H04L 67/04; H04L
    63/0853; H04L 29/12594; H04W 4/02;
    H04W 4/50; H04W 4/80; H04W 4/16
    See application file for complete search history.

(56) References Cited

U.S. PATENT DOCUMENTS

| | | | |
|---|---|---|---|
| 5,485,291 | A | 1/1996 | Qiao |
| 5,641,219 | A | 6/1997 | Mizobe |
| 5,720,123 | A | 2/1998 | Taylor |
| 5,841,350 | A | 11/1998 | Appalucci et al. |
| 5,867,017 | A | 2/1999 | Merwin et al. |
| 5,921,674 | A | 7/1999 | Koczi |
| 5,944,405 | A | 8/1999 | Takeuchi |
| 5,945,938 | A | 8/1999 | Chia et al. |
| 5,947,578 | A | 9/1999 | Ayres |
| 6,142,375 | A | 11/2000 | Belka et al. |
| 6,144,264 | A | 11/2000 | Wen |
| 6,246,778 | B1 | 6/2001 | Moore |
| 6,744,367 | B1 | 6/2004 | Forster |
| 6,771,256 | B1 | 8/2004 | Abraham et al. |
| 6,786,626 | B2 | 9/2004 | Wu |
| 6,838,989 | B1 | 1/2005 | Mays et al. |
| 6,839,035 | B1 | 1/2005 | Addonisio et al. |
| 6,851,999 | B2 | 2/2005 | Fong |
| 6,965,205 | B2 | 11/2005 | Piepgras et al. |
| 7,012,544 | B2 | 3/2006 | Cunningham et al. |
| 7,046,160 | B2 | 5/2006 | Pederson et al. |
| 7,064,498 | B2 | 6/2006 | Dowling et al. |
| 7,084,769 | B2 | 8/2006 | Bauer et al. |
| 7,086,587 | B2 | 8/2006 | Myllymaki |
| 7,086,769 | B1 | 8/2006 | Thompson et al. |
| 7,098,794 | B2 | 8/2006 | Lindsay |
| 7,109,986 | B2 | 9/2006 | Kerr et al. |
| 7,167,106 | B2 | 1/2007 | Haase |
| 7,202,838 | B2 | 4/2007 | Kerr et al. |
| 7,304,577 | B2 | 12/2007 | Waldner |
| 7,375,650 | B2 | 5/2008 | Lo |
| 7,377,421 | B2 | 5/2008 | Rhoads |
| 7,378,973 | B2 | 5/2008 | Dixon |
| 7,477,152 | B2 | 1/2009 | Forster |
| 7,490,054 | B2 | 2/2009 | Reade et al. |
| 7,492,346 | B2 | 2/2009 | Manabe |
| 7,495,576 | B2 | 2/2009 | Maskeny et al. |
| 7,515,149 | B2 | 4/2009 | Kerr et al. |
| 7,564,426 | B2 | 7/2009 | Poor |
| 7,600,906 | B2 | 10/2009 | Chon |
| 7,654,723 | B2 | 2/2010 | Chang |
| 7,670,020 | B2 | 3/2010 | Chang |
| 7,695,165 | B2 | 4/2010 | Chang |
| 7,722,172 | B2 | 5/2010 | Silverbrook |
| 7,722,241 | B2 | 5/2010 | Chang |
| 7,737,858 | B2 | 6/2010 | Matityaho |
| 7,750,810 | B2 | 7/2010 | Ritter et al. |
| 7,752,790 | B1 | 7/2010 | Michael et al. |
| 7,756,467 | B2 | 7/2010 | Bent et al. |
| 7,810,983 | B2 | 10/2010 | Chang |
| 7,817,045 | B2 | 10/2010 | Onderko |
| 7,845,823 | B2 | 12/2010 | Mueller |
| 7,850,341 | B2 | 12/2010 | Mrakovich |
| 7,868,778 | B2 | 1/2011 | Kenwright |
| 7,876,101 | B2 | 1/2011 | Lee |
| 7,903,103 | B2 | 3/2011 | Osterberg et al. |
| 7,920,050 | B2 | 4/2011 | Juels |
| 7,959,326 | B2 | 6/2011 | Laporte |
| 7,961,097 | B2 | 6/2011 | Porte et al. |
| 7,979,026 | B2 | 7/2011 | Hulvey |
| 8,014,722 | B2 | 9/2011 | Abel et al. |
| 8,018,345 | B2 | 9/2011 | Xiang |
| 8,068,011 | B1 | 11/2011 | Sajadi et al. |
| 8,102,797 | B2 | 1/2012 | Abel |
| 8,112,066 | B2 | 2/2012 | Ayed |
| 8,117,445 | B2 | 2/2012 | Werner et al. |
| 8,126,505 | B2 | 2/2012 | Tulloch |
| 8,242,893 | B1 | 8/2012 | Lin |
| 8,249,935 | B1 | 8/2012 | DiMartino et al. |
| 8,321,922 | B1 | 11/2012 | Lo et al. |
| 8,326,991 | B2 * | 12/2012 | Diaz ............... H04Q 9/00 340/572.1 |
| 8,332,272 | B2 | 12/2012 | Fisher |
| 8,469,269 | B2 | 6/2013 | Daily et al. |
| 8,474,700 | B1 | 7/2013 | Lewis et al. |
| 8,638,228 | B2 | 1/2014 | Amigo et al. |
| 8,655,286 | B2 | 2/2014 | Mendolia |
| 8,937,531 | B2 | 1/2015 | Rimai et al. |
| 8,961,306 | B2 | 2/2015 | LeMay et al. |
| 9,024,763 | B2 | 5/2015 | Hamedani |
| 9,108,434 | B2 | 8/2015 | Tsirline et al. |
| 9,894,468 | B2 | 2/2018 | Brown et al. |
| 2002/0030992 | A1 | 3/2002 | Lefebvre |
| 2002/0036622 | A1 | 3/2002 | Jaeger et al. |
| 2002/0154633 | A1 | 10/2002 | Shin |
| 2002/0159246 | A1 | 10/2002 | Murasko et al. |
| 2002/0186133 | A1 | 12/2002 | Loof |
| 2002/0190845 | A1 | 12/2002 | Moore |
| 2003/0029918 | A1 | 2/2003 | Leanheart et al. |
| 2003/0034985 | A1 | 2/2003 | Needham Riddle |
| 2003/0115096 | A1 | 6/2003 | Reynolds |
| 2004/0012486 | A1 | 1/2004 | Mani |
| 2004/0183742 | A1 | 9/2004 | Goff et al. |
| 2004/0220860 | A1 | 11/2004 | Persky et al. |
| 2005/0017071 | A1 | 1/2005 | Noonan |
| 2005/0186902 | A1 | 8/2005 | Lieffort et al. |
| 2005/0207823 | A1 | 9/2005 | Adams et al. |
| 2005/0280631 | A1 | 12/2005 | Wong et al. |
| 2006/0028822 | A1 | 2/2006 | Tanamachi |
| 2006/0032926 | A1 | 2/2006 | Baba et al. |
| 2006/0066453 | A1 | 3/2006 | Homanfar et al. |
| 2006/0071778 | A1 * | 4/2006 | Vesikivi ............ G06F 17/30876 340/539.1 |
| 2006/0080819 | A1 | 4/2006 | Mcallister |
| 2006/0090384 | A1 | 5/2006 | Woodruff |
| 2006/0160488 | A1 | 7/2006 | Sueoka et al. |
| 2006/0214794 | A1 | 9/2006 | Wang |
| 2006/0215958 | A1 | 9/2006 | Yeo |
| 2006/0230276 | A1 | 10/2006 | Nochta |
| 2006/0261938 | A1 | 11/2006 | Lai |
| 2006/0261950 | A1 | 11/2006 | Arneson et al. |
| 2006/0266824 | A1 | 11/2006 | Hassenbuerger |
| 2006/0273176 | A1 | 12/2006 | Audebert et al. |
| 2006/0290501 | A1 | 12/2006 | Hammad et al. |
| 2006/0293956 | A1 | 12/2006 | Walker et al. |
| 2007/0008140 | A1 | 1/2007 | Saarisalo et al. |
| 2007/0013479 | A1 | 1/2007 | Goel et al. |
| 2007/0022294 | A1 | 1/2007 | Lapstun et al. |
| 2007/0029384 | A1 | 2/2007 | Atherton |
| 2007/0029939 | A1 | 2/2007 | Burkum et al. |
| 2007/0056871 | A1 | 3/2007 | Griffiths |
| 2007/0057791 | A1 | 3/2007 | Karjoth et al. |
| 2007/0075145 | A1 | 4/2007 | Arendonk et al. |
| 2007/0090954 | A1 | 4/2007 | Mahaffey |
| 2007/0120772 | A1 | 5/2007 | Kim et al. |
| 2007/0135112 | A1 | 6/2007 | Lessing |
| 2007/0145152 | A1 | 6/2007 | Jogand-Coulomb et al. |
| 2007/0188483 | A1 | 8/2007 | Bonner |
| 2007/0194879 | A1 | 8/2007 | Backes et al. |
| 2007/0215685 | A1 | 9/2007 | Self et al. |
| 2007/0229250 | A1 | 10/2007 | Recker |
| 2007/0273951 | A1 | 11/2007 | Ribi |
| 2007/0274242 | A1 | 11/2007 | Lamacraft et al. |
| 2008/0022160 | A1 | 1/2008 | Chakraborty |
| 2008/0040845 | A1 | 2/2008 | Shoshan |

(56) References Cited

U.S. PATENT DOCUMENTS

| | | |
|---|---|---|
| 2008/0064346 A1 | 3/2008 | Charrat |
| 2008/0079582 A1 | 4/2008 | Alexis et al. |
| 2008/0094854 A1 | 4/2008 | Coleman |
| 2008/0101400 A1 | 5/2008 | Auterinen |
| 2008/0117047 A1 | 5/2008 | Collins et al. |
| 2008/0132167 A1 | 6/2008 | Bent et al. |
| 2008/0136647 A1 | 6/2008 | Brown |
| 2008/0146148 A1 | 6/2008 | Hulvey |
| 2008/0150719 A1 | 6/2008 | Cote et al. |
| 2008/0162154 A1 | 7/2008 | Fein et al. |
| 2008/0183581 A1 | 7/2008 | Coppolani |
| 2008/0191878 A1 | 8/2008 | Abraham |
| 2008/0192932 A1 | 8/2008 | Graeber et al. |
| 2008/0219227 A1 | 9/2008 | Michaelis |
| 2008/0238610 A1 | 10/2008 | Rosenberg |
| 2008/0238706 A1 | 10/2008 | Kenwright |
| 2008/0248815 A1 | 10/2008 | Busch |
| 2008/0251582 A1 | 10/2008 | Nguyen |
| 2008/0255960 A1 | 10/2008 | Nguyen |
| 2008/0258875 A1 | 10/2008 | Jesme et al. |
| 2008/0262928 A1 | 10/2008 | Michaelis |
| 2008/0276507 A1 | 11/2008 | Hines |
| 2008/0300985 A1 | 12/2008 | Shamp et al. |
| 2008/0309463 A1 | 12/2008 | Godzwon et al. |
| 2009/0081943 A1 | 3/2009 | Dobyns et al. |
| 2009/0085746 A1 | 4/2009 | Ericikson et al. |
| 2009/0088077 A1 | 4/2009 | Brown et al. |
| 2009/0088229 A1 | 4/2009 | Hammad et al. |
| 2009/0102748 A1 | 4/2009 | Stoyer et al. |
| 2009/0115614 A1 | 5/2009 | Bertin |
| 2009/0118006 A1 | 5/2009 | Kelly et al. |
| 2009/0146814 A1 | 6/2009 | Hammad et al. |
| 2009/0168441 A1 | 7/2009 | Lin |
| 2009/0189816 A1 | 7/2009 | Nikiti |
| 2009/0192937 A1 | 7/2009 | Griffin et al. |
| 2009/0193500 A1 | 7/2009 | Griffin |
| 2009/0197551 A1 | 8/2009 | Paraskake |
| 2009/0212919 A1 | 8/2009 | Selgrath et al. |
| 2009/0221240 A1 | 9/2009 | Zhang |
| 2009/0257242 A1 | 10/2009 | Wendman |
| 2009/0258678 A1 | 10/2009 | Chava et al. |
| 2009/0282859 A1 | 11/2009 | Glielmo et al. |
| 2009/0292816 A1 | 11/2009 | Etchegoyen |
| 2009/0297157 A1 | 12/2009 | Nakagawa |
| 2009/0315670 A1* | 12/2009 | Naressi ............... G06F 21/10 340/5.8 |
| 2010/0009627 A1 | 1/2010 | Huomo |
| 2010/0012715 A1 | 1/2010 | Williams et al. |
| 2010/0026464 A1 | 2/2010 | Graeber |
| 2010/0030636 A1 | 2/2010 | Vijayshankar et al. |
| 2010/0046198 A1 | 2/2010 | Hoffman |
| 2010/0066508 A1 | 3/2010 | Jokinen et al. |
| 2010/0066561 A1 | 3/2010 | Ulrich et al. |
| 2010/0075666 A1 | 3/2010 | Garner |
| 2010/0079416 A1 | 4/2010 | Chung et al. |
| 2010/0082444 A1 | 4/2010 | Lin et al. |
| 2010/0082485 A1 | 4/2010 | Lin et al. |
| 2010/0085774 A1 | 4/2010 | Park |
| 2010/0107463 A1 | 5/2010 | Spiro |
| 2010/0123553 A1 | 5/2010 | Banerjee et al. |
| 2010/0141452 A1 | 6/2010 | Lian et al. |
| 2010/0148964 A1 | 6/2010 | Broer |
| 2010/0148965 A1 | 6/2010 | Alexis et al. |
| 2010/0161410 A1 | 6/2010 | Tulloch |
| 2010/0161434 A1 | 6/2010 | Herwig et al. |
| 2010/0172149 A1 | 7/2010 | Siemiet |
| 2010/0174599 A1 | 7/2010 | Rosenblatt et al. |
| 2010/0176971 A1 | 7/2010 | Banerjee et al. |
| 2010/0188842 A1 | 7/2010 | Yohananoff |
| 2010/0211431 A1 | 8/2010 | Lutnick et al. |
| 2010/0216396 A1 | 8/2010 | Fernandez et al. |
| 2010/0217709 A1 | 8/2010 | Aabye et al. |
| 2010/0221999 A1 | 9/2010 | Braun et al. |
| 2010/0231362 A1 | 9/2010 | Smith et al. |
| 2010/0241494 A1 | 9/2010 | Kumar et al. |
| 2010/0255865 A1 | 10/2010 | Karmarkar |
| 2010/0262449 A1 | 10/2010 | Monteforte et al. |
| 2010/0265041 A1 | 10/2010 | Almog et al. |
| 2010/0269383 A1 | 10/2010 | Nifenecker |
| 2010/0271839 A1 | 10/2010 | Chan |
| 2010/0274859 A1 | 10/2010 | Bucuk |
| 2010/0275265 A1 | 10/2010 | Fiske |
| 2010/0282849 A1 | 11/2010 | Mair |
| 2010/0290251 A1 | 11/2010 | Wang |
| 2010/0294835 A1 | 11/2010 | Bam et al. |
| 2010/0303230 A1 | 12/2010 | Taveau et al. |
| 2010/0306076 A1 | 12/2010 | Taveau |
| 2010/0306819 A1 | 12/2010 | Nahari et al. |
| 2010/0311326 A1 | 12/2010 | Klabunde et al. |
| 2011/0000971 A1 | 1/2011 | Onderko |
| 2011/0047463 A1* | 2/2011 | Shepherd ............... G06Q 10/10 715/723 |
| 2011/0047759 A1 | 3/2011 | Reiter |
| 2011/0065383 A1 | 3/2011 | Frankland et al. |
| 2011/0084814 A1 | 4/2011 | Ramsch |
| 2011/0112918 A1 | 5/2011 | Mestre et al. |
| 2011/0112920 A1 | 5/2011 | Mestre et al. |
| 2011/0114735 A1 | 5/2011 | Ziai et al. |
| 2011/0149596 A1 | 6/2011 | Lv et al. |
| 2011/0156640 A1 | 6/2011 | Moshfeghi |
| 2011/0165859 A1 | 7/2011 | Wengrowitz |
| 2011/0185607 A1 | 8/2011 | Forster et al. |
| 2011/0187558 A1 | 8/2011 | Serex |
| 2011/0191478 A1 | 8/2011 | Eischeid et al. |
| 2011/0195748 A1 | 8/2011 | Main et al. |
| 2011/0211344 A1 | 9/2011 | Harbers |
| 2011/0225421 A1 | 9/2011 | Han et al. |
| 2011/0227487 A1 | 9/2011 | Nichol |
| 2011/0227507 A1 | 9/2011 | Salm |
| 2011/0228517 A1 | 9/2011 | Kawabat |
| 2011/0234379 A1 | 9/2011 | Lee |
| 2011/0235318 A1 | 9/2011 | Simon |
| 2011/0238995 A1 | 9/2011 | Blanco |
| 2011/0258443 A1 | 10/2011 | Barry |
| 2011/0276961 A1* | 11/2011 | Johansson ............... G06F 8/61 717/178 |
| 2011/0287718 A1 | 11/2011 | Abel |
| 2011/0295108 A1 | 12/2011 | Cox et al. |
| 2011/0307309 A1 | 12/2011 | Forster et al. |
| 2011/0320291 A1 | 12/2011 | Coon |
| 2011/0320314 A1 | 12/2011 | Brown |
| 2011/0320345 A1 | 12/2011 | Taveau et al. |
| 2012/0001725 A1 | 1/2012 | Chen |
| 2012/0013448 A1 | 1/2012 | Baranowski |
| 2012/0024951 A1 | 2/2012 | Graeber |
| 2012/0029990 A1 | 2/2012 | Fisher |
| 2012/0032632 A1 | 2/2012 | Soar |
| 2012/0039472 A1 | 2/2012 | Liu et al. |
| 2012/0059741 A1 | 3/2012 | Khan et al. |
| 2012/0061465 A1 | 3/2012 | Luo |
| 2012/0072979 A1 | 3/2012 | Cha |
| 2012/0075148 A1 | 3/2012 | Cho |
| 2012/0083205 A1 | 4/2012 | Marcu et al. |
| 2012/0089845 A1 | 4/2012 | Raleigh |
| 2012/0126700 A1 | 5/2012 | Mayfield et al. |
| 2012/0154633 A1 | 6/2012 | Rodriguez |
| 2012/0156992 A1 | 6/2012 | Walker et al. |
| 2012/0218084 A1 | 8/2012 | Arponen et al. |
| 2012/0253974 A1 | 10/2012 | Haikonen et al. |
| 2012/0256494 A1 | 10/2012 | Kesler et al. |
| 2012/0265596 A1 | 10/2012 | Mazed et al. |
| 2012/0265682 A1 | 10/2012 | Menon |
| 2012/0278676 A1 | 11/2012 | Teraura |
| 2013/0006847 A1 | 1/2013 | Hammad et al. |
| 2013/0063008 A1 | 3/2013 | Martin |
| 2013/0106576 A1 | 5/2013 | Hinman et al. |
| 2013/0165041 A1 | 6/2013 | Bukovjan et al. |
| 2013/0173455 A1 | 7/2013 | Adams et al. |
| 2013/0176184 A1 | 7/2013 | Dokai et al. |
| 2013/0309965 A1 | 11/2013 | Hillan |
| 2013/0342323 A1 | 12/2013 | Hinman et al. |
| 2013/0344805 A1 | 12/2013 | Lefley |
| 2014/0009268 A1 | 1/2014 | Oshima et al. |
| 2014/0070850 A1 | 3/2014 | Darwhekar et al. |

(56) References Cited

U.S. PATENT DOCUMENTS

| | | |
|---|---|---|
| 2014/0113551 A1 | 4/2014 | Krishnan et al. |
| 2014/0145823 A1 | 5/2014 | Aase |
| 2014/0152856 A1 | 6/2014 | Ikeda et al. |
| 2014/0252083 A1 | 9/2014 | Lee et al. |
| 2015/0140929 A1 | 5/2015 | Lefley |
| 2015/0334521 A1 | 11/2015 | Lee |
| 2016/0283759 A1 | 9/2016 | Forster |
| 2017/0012355 A1 | 1/2017 | Pachler et al. |

FOREIGN PATENT DOCUMENTS

| | | |
|---|---|---|
| CN | 201302803 Y | 9/2009 |
| CN | 102217410 | 10/2011 |
| EP | 1127469 B1 | 7/2003 |
| EP | 1914631 | 4/2008 |
| EP | 1948995 | 4/2010 |
| EP | 2143991 | 6/2010 |
| EP | 1792272 B1 | 10/2010 |
| EP | 2237519 | 10/2010 |
| EP | 2296025 | 3/2011 |
| EP | 2309431 A1 | 4/2011 |
| EP | 2366937 | 9/2011 |
| EP | 2371110 | 10/2011 |
| FR | 2783960 | 3/2000 |
| JP | 2006011422 | 1/2006 |
| JP | 2006030882 | 2/2006 |
| JP | 2006058435 | 3/2006 |
| JP | 2006349887 | 12/2006 |
| JP | 2007034362 | 2/2007 |
| JP | 2002162918 | 6/2007 |
| KR | 20100072115 | 6/2010 |
| WO | 2006031824 | 3/2006 |
| WO | 2006095212 | 8/2006 |
| WO | 2006098765 | 8/2006 |
| WO | 2006111782 | 10/2006 |
| WO | 2007002459 | 1/2007 |
| WO | 2007035835 | 3/2007 |
| WO | 2007064069 | 6/2007 |
| WO | 2008034937 | 3/2008 |
| WO | 2008063706 | 5/2008 |
| WO | 2008087431 | 7/2008 |
| WO | 2008132269 | 11/2008 |
| WO | 2008142455 | 11/2008 |
| WO | 2009028203 | 3/2009 |
| WO | 2010077194 | 7/2010 |
| WO | 2010095988 | 8/2010 |
| WO | 2010148816 | 12/2010 |
| WO | 2011010970 | 1/2011 |
| WO | 2011020041 | 2/2011 |
| WO | 2011033424 | 3/2011 |
| WO | 2011053914 | 5/2011 |
| WO | 2011088190 | 7/2011 |
| WO | 2011094384 | 8/2011 |
| WO | 2011109092 | 9/2011 |
| WO | 2011112778 | 9/2011 |
| WO | 2011121488 | 10/2011 |
| WO | 2012037255 | 3/2012 |

OTHER PUBLICATIONS

"NFC Record Type Definition (RTD)", Technical Specification NFC Forum, RTD 1.0, NFCForum-TS-RTD_1 .0, (Jul. 24, 2006), 20 pgs.
"Radio Frequency Identification (RFID): A Focus on Information Security and Privacy", OECD Digital Economy Papers, No. 138, Jan. 14, 2008, 11-81.
"Radio-Frequency-IDentific@tion, http://rfid-handbook.com/", advertisement (Dec. 2, 2011), 5 pgs.
"South Korea Telecommunications Report Included BMI's Forecasts", Q2 2012, Business Monitor International Ltd., (Apr. 2012), 94 pgs.
A Near Field Communication Tool for Building Intelligent Environment using Smart Posters, International Journal of Computers and Communications, Issue 1, vol. 4, 2010, Pilar Castro Garrido, Guillermo Matas Miraz, Irene Luque Ruiz, and Miguel Angel Gomez-Nieto.
A Pervasive Presentator—Simplifying the Task of Presenting, Lulea University of Technology; Viktor Lindgren, Mattias Lundberg, Elias Naslund, John Viklund (2012).
A System of Secure Virtual Coupons Using NFC Technology, IEEE Computer Society, CompProceedings of the Fifth Annual IEEE International Conference on Pervasive Computing and Communications Workshops 2007 (PerComW'07); Manfred Aigner, Sandra Dominikus, Martin Feldhofer.
Amato-McCoy, Deena M. Crime stoppers: by focusing their loss prevention efforts on the entire enterprise, grocers are in a better position to combat internal and external theft. Grocery Headquarters, v77, No. 11, p. 101 (3). Nov. 2011.
Anonymous, "Near-field communications will be standard technology for mobiles", Electronics Weekly, (Feb. 21, 2007), p. 8.
Antoniou, Zoe, "NFC-Based Mobile Middleware for Intuitive User Interaction With Security in Smart Homes", Proc. Of the 5th IASTED International Conference on Communication Systems and Networks (CSN'06), Aug. 28-30, 2006, Palma De Mallorca, Spain, Track 543-038, 6pgs.
Application of Near Field Communication for Health Monitoring in Daily Life; Esko Strommer, Jouni Kaartenen, Juha Parkka, Arto Ylisauko-oja, Ilkka Korhonen; Proceedings of the 28th IEEE EMBS Annual International Conference New York City, USA, Aug. 30-Sep. 3, 2006.
Bauer-Reich,C., et al. "Low-profile, high-permeability antennaless RFID tags for use on metal objects", Proceedings of the 2012 IEEE International Workshop on Antenna Technology (iWAT), (Mar. 5-7, 2012), 32-35.
Becher, Michael et al., "Mobile Security Catching Up? Revealing the Nuts and Bolts of the Security of Mobile Devices", 2011 IEEE Symposium on Security and Privacy, 96-11.
Bling: NFC Arrives in U.S., Sam Churchill, Oct. 27, 2010, http://www.dailywireless.org/2010/10/27/bling-nfc-arrives-in-u-s/.
Bovelli, S., "A Novel Antenna Design for Passive RFID Transponders on Metal Surfaces", Proceedings of the 36th European Microwave Conference, Manchester, UK (Sep. 2006), 580-582.
Broll, Gregor, et al., "Touch to Play—Exploring Touch-Based Mobile Interaction with Public Displays", 3rd International Workshop on Near Field Communication, Feb. 22, 2011, 15-20.
Cavoukian, A., "Mobile Near Field Communications (NFC)—"Tap'n Go"—Keep it Secure & Private", Information and Privacy Commissioner, Ontario, Canada / Privacy by Design (Nov. 2011), 22 pgs.
Chai, Qi, "Design and Analysis of Security Schemes for Low-cost RFID Systems", Doctor of Philosophy Thesis in Electrical and Computer Engineering, University of Waterloo, Ontario, Canada, 2012, 184 pgs.
Cheng, Hsu-Chen, et al., "A Secure and Practical Key Management Mechanism for NFC Read-Write Mode", J. Computational Information Systems, 7:11, (2011), 3819-3828.
Cheng, Jerry, et al., "SmartSiren: Virus Detection and Alert for Smartphones", MobiSys'07, Jun. 11-4, 2007, San Juan, Puerto Rico, 258-271.
Choi, Kwanghoon, et al., "A Secure Application Invocation Mechanism in Mobile Phones for Near Field Communication", 2012 IEEE International Conference on Consumer Electronics (ICCE), Jan. 2012, 731-732.
Christian Metzger et al: "Making Radio Frequency Indentificaiton Visible—A Watchdog Tag", Fifth Annual IEEE International Conference on pervasive computing and communications workshops, Mar. 19-23, 2007.
Christianson, B., et al. (eds.), "Security Protocols", 13th International Workshop, Revised Selected Papers, Cambridge, UK, (Apr. 20-22, 2005), Lecture Notes in Computer Science , 4631, Springer-Verlag, Berlin, 354 pgs.
Close Contact: An Examination of the Future of Near Field Communications, International Journal of Management & Information Systems—First Quarter 2012 vol. 16, No. 1; Chris Rose Capella.

(56) References Cited

OTHER PUBLICATIONS

Cole, P.H., et al., Networked RFID Systems and Lightweight Cryptography: Raising Barriers to Product Counterfeiting, First Edition, Springer-Verlag, Berlin (2003), 350 pgs.
Connecting the Mobile Phone with the Internet of Things—Benefits of EPC and NFC Compatibility; Thomas J.P. Wiechert, Florian Michahelles, 2007.
Coppolino, Luigi, et al., "A Trusted information Agent for Security Information and Event Management", ICONS 2012: The Seventh International Conference on Systems, 6-12.
Do you talk to each poster? Security and Privacy for Interactions with Web Service by means of Contact Free Tag Readings, Peter Schoo, Massimo Paolucci, Feb. 24, 2009 First International Workshop on Near Field Communication.
Dodson, B., et al., "Micro-Interactions with NFC-Enabled Mobile Phones", Proceedings of the Third International Conference on Mobile Computing, Applications, and Services (MobiCASE), Los Angeles, CA, Oct. 2011. Retrieved from the Internet: <URL: http://mobisocial.stanford.edu/papers/mobicase11.pdf>, 20 pgs.
Elliptic Curve Certificates and Signatures for NFC Signature Records, Reasearch in Motion, Certicom Research, Jan. 1, 2011, Tony Rosati, Greg Zaverucha.
Enabling RFID in Retail, George Roussos, Birkbeck, University of London, IEEE Computer Society, Mar. 2006.
Encrypted NFC emergency tags based on the German Telematics Infrastructure, 2011 Third International Workshop on Near Field Communication, Sebastian Dunnebeil, Felix Kobler, Philip Koene, Helmut Kremar, Jan Marco Leimeister.
Enhancing Authentication in eBanking with NFC enabled mobile phones, Aug. 11, 2008, Diego Alejandro Ortiz-Yepes.
Enhancing Security and Usability Features of NFC, 2009; Beygo, Omer Kerem; Eraslan, Cihan.
European Search Report dated Nov. 25, 2016 for European Application No. EP16002075 filed Sep. 26, 2016.
Finkenzeller, K., "Known attacks on RFID systems, possible countermeasures and upcoming standardization activities", presentation slides, RFID-Systech, Bremen, Germany, Jun. 2009. Retrieved from the Internet: <URL: http://rfidhandbook.de/downloads/Finkenzeller_Systech-Bremen-2009_v1.0.pdf>, 31 pgs.
Francis, Lishoy, et al., "Practical NFC Peer-to-Peer Relay Attack Using Mobile Phones", The 6th Workshop on RFID Security (RFIDSec 2010), Istanbul, Turkey (LNCS), Jun. 7-9, 2010, 35-49.
Francis, Lishoy, et al., "Practical Relay Attack on Contactless Transactions by Using NFC Mobile Phones", In Cryptology ePrint Archive, Report 2011/618, Nov., 2011, 16pgs.
Gebhart, M, et al., "Design of 13.56 MHz Smartcard Stickers with Ferrite for Payment and Authentication ", Proceedings of the 2011 3rd International Workshop on Near Field Communication (NFC), Feb. 21-22, 2011. Retrieved from the Internet: <URL: https://online.tugraz.at/tug_online/voe_main2.getVollText?pDocumentNr=202812&pCurrPk=59398>, 6 pgs.
Ghanname, Taoufik. How NFC can to speed Bluetooth transactions—today. Eetimes. Feb. 14, 2006. Retrieved at http://eetimes.com/General/PrintView/4012606.
Hancke, G.P., "Practical Eavesdropping and Skimming Attacks on High-Frequency RFID Tokens", Preprint version of article published in Journal of Computer Security. vol. 19, Issue 2. (Jun. 2010). Retrieved from the Internet: <URL: http://www.rfidblog.org.uk/Hancke-JoCSSpecialRFIDJune2010.pdf>, 23 pgs.
Hancke, G.P., "Security of proximity identification systems", Technical Report, No. 752, University of Cambridge Computer Laboratory, UK (Jul. 2009), 161 pgs.
Hancke, G.P., et al., "Security Challenges for User-Orented RFID Applications within the 'Internet of Things'", J. Internet Technology, vol. 11, No. 3, 2010, 307-313.
Hardy, Robert, et al., "Touch & Interact: Touch-based Interaction of Mobile Phones with Displays", MobileHCL 2008, Proc. 10th international conference on Human computer interaction with mobile devices and services, 245-254.
Haselsteiner, Ernst, et al., "Security in Near Field Communication (NFC): Strengths and Weaknesses", Proceedings of the Workshop on RFID Security (RFIDSec), Graz, Austria, Jul. 12-14, 2006, 11pgs.
Hend S. Al-Khalifa: "Utilizing QR Code and Mobile Phones for Blinds and Visually Impaired People", copyright 2008.
Hinske, S., et al., "RFIDice—Augmenting Tabletop Dice with RFID", Journal of Virtual Reality and Broadcasting, vol. 5, No. 4, (2008), 12 pgs.
Husni, Emir, et al., "Efficient Tag-to-Tag Near Field Communication (NFC) Protocol for Secure Mobile Payment", 2nd International Conference on Instrumentation, Communications, Information Technology, and Biomedical Engineering (ICICI-BME), Bandung, Indonesia, Nov. 8-9, 2011, 97-101.
International Preliminary Report on Patentability and Written Opinion dated Apr. 21, 2015 for International Application PCT/US13/031448 filed Mar. 14, 2013.
International Preliminary Report on Patentability and Written Opinion dated Jul. 31, 2012 for International Application PCT/US11/022680 filed Jan. 27, 2011.
International Preliminary Report on Patentability and Written Opinion dated Jul. 31, 2012 for International Application PCT/US11/022687 filed Jan. 27, 2011.
International Preliminary Report on Patentability and Written Opinion dated Mar. 4, 2014 for International Application PCT/US12/053322 filed Aug. 31, 2012.
International Preliminary Report on Patentability and Written Opinion dated Mar. 10, 2015 for International Application PCT/US12/031136 filed Mar. 14, 2013.
International Preliminary Report on Patentability and Written Opinion dated May 19, 2015 for International Application PCT/US12/031131 filed Mar. 14, 2013.
International Search Report dated Aug. 20, 2013 for International Application PCT/US13/031131 filed Mar. 14, 2013.
International Search Report dated Aug. 6, 2013 for International Application PCT/US13/031448 filed Mar. 14, 2013.
International Search Report dated Mar. 11, 2011 for International Application PCT/US11/022687 filed Jan. 27, 2011.
International Search Report dated Mar. 8, 2011 for International Application PCT/US11/022680 filed Jan. 27, 2011.
International Search Report dated May 22, 2013 for International Application PCT/US12/031136 filed Mar. 14, 2013.
International Search Report and Written Opinion dated Mar. 4, 2014 for International Application PCT/US12/053322 filed Aug. 31, 2012.
Johnansson, B., "An Introduction to RFID—Information Security and Privacy Concerns", TDDC03 Projects, (Spring 2004), 14 pgs.
Juels, A., et al., "The Blocker Tag: Selective Blocking of RFID Tags for Consumer Privacy", Proceedings of ACC CCS'03, Washington, DC (Oct. 27-30, 2003), 9 pgs.
Jung, M, et al., "All-Printed and Roll-to-Roll Printable 13.56-MHz-Operated 1-bit RF Tag on Plastic Foils", IEEE Transactions on Electron Devices, (Feb. 19, 2010), 10 pgs.
Kazmi, Hammad Raza, "Security and Privacy Issues in Near Field Communication (NFC) Systems",Master Thesis, Royal Institute of Technology, Sweden, Apr. 201 1, 59 pgs.
Kfir, Ziv, et al., "Picking Virtual Pockets using Relay Attacks on Contactless Smartcard Systems", Proceeding of the First International Conference on Security and Privacy for Emerging Areas in Communications Networks, Sep. 5-9, 2005, 47-58.
Kortvedt, H.S., "Securing Near Field Communication ", Thesis for Master of Science in Communication Technology, Norwegian University of Science and Technology, (Jun. 2009), 135 pgs.
Kuo, S., "A performance evaluation method for EMI sheet of metal mountable HR RFID tag", Measurement, 44 (2011), 946-953.
Kupusamy, K. S. et al., "A Model for Remote Access and Protection of Smartphones Using Short Message Service", International]. Computer Science, Engineering and. Information Technology (IJCSEIT), vol. 2, No. 1, (Feb. 2012), 91-100.
LocaTag-An NFC-based system enhancing instant messaging tools with real-time user location; Kobler, Philip Koene, Helmut Kremar, Matthias Altmann, Jan Marco Leimeister, Apr. 20, 2010 Second International Workshop on Near Field Communication.

(56) References Cited

OTHER PUBLICATIONS

Location-Triggered Code Execution-Dismissing Displays and Keypads for Mobile Interaction; W. Narzt and H. Schmitzberger, C. Stephanidis (Ed.): Universal Access in HCI, Part II, HCII 2009, LNCS 5615, pp. 374-383, 2009. © Springer-Verlag Berlin Heidelberg 2009.

Long, Men, et al., "Human Perceivable Authentication: An Economical Solution for Security Associations in Short-Distance Wireless Networking", Proceedings of 16th International Conference on Computer Communications and Networks, Aug. 13-16, 2007, 257-264.

Madlmayr, Gerald, etal., "NFC Devices: Security & Privacy", Proceedings of the 3rd International Conference on Availability, Reliability and Security, Barcelona, Spain, Mar. 7, 2008, 13 pgs.

Media Clips: Implementation of an Intuitive Media Linker; Seunghyun Yoon, Kyuyun Lee, Hyunchang Shin, Samsung Electronics, 2011 IEEE International Symposium on Broadband Multimedia Systems and Broadcasting (BMSB) held Jun. 8-10, 2011.

Mitrokotsa, a., et al., "Classification of RFID Attacks", Proceedings of the 2nd International Workshop on RFID Technology—Concepts, Applications, Challenges (IWRT 2008), in conjunction with the 10th International Conference on Enterprise Information Systems, pp. 73-86, Barcelona, Spain, Jun. 2008. INSTICC Press, Portugal. Retrieved from the Internet: <URL: http://www.cs.vu.nl/~ast/publications/iwrt-2008.pdf>.

Mobile Personal Devices meet Situated Public Displays: Synergies and Opportunities; Alan Dix, Corina Sas (2010). International Journal of Ubiquitous Computing (IJUC), 1(1), pp. 11-28. http://www.hcibook.com/alan/papers/MPD-SPD-2010/.

Mulliner, Collin, "Attacking NFC Mobile Phones", 25th Chaos Communication Congress, Berlin, Germany (Dec. 2008). Retrieved from the Internet: <URL: http://www.mulliner.org/nfc/feed/collin_mulliner_25c3_attacking_nfc_phones.pdf>, 71 pgs.

Mulliner, Collin, "Vulnerability Analysis and Attacks on NFC-enabled Mobile Phones", 2009 International Conference on Availability, Reliability and Security, Fukuoka, Japan,Mar. 16-19, 2009, 695-700.

Near Field Communication in Smartphones, Simon Burkard, Berlin Institute of Technology, Germany, 2012.

Near Field Communications Handbook, vol. 13 of Internet and Communications, 2009; Mohammad Ilyas.

Newport Digital Technologies to Implement Microsoft Licensing Agreement; Prepares to Launch First Ruggedized RFID Reader with Windows Mobile Operating System. Business Wire Oct. 20, 2009.

NFC and Mobile Payments Today, Andre Filipe de Axevedo Figueiredo Cruz, Nov. 2011.

NFC Data Exchange Format (NDEF), Technical Specification, NDEF 1.0, Jul. 24, 2006.

NFC Forum Type Tags, White Paper V1.0, Apr. 1, 2009—Public.

NFC Mobile Parlor Games Enabling Direct Player to Player Interaction, 2011 Third International Workshop on Near Field Communication, Avinash Nandwani, Paul Coulton, Reuben Edwards.

NFC-Based Mobile Interactions with Direct-View Displays; Khoovirajsingh Seewoonauth, Enrico Rukzio, Robert Hardy, and Paul Holleis, IFIP Conference on Human-Computer Interaction—INTERACT 2009 pp. 835-838.

NFC-CAP Securty Assessment, vol. 1.0—May 11, 2009; Diego A. Ortiz-Yepes.

Ongtang, Machiagar, et al. "Semantically Rich Application-Centric Security in Android", Security and Communication Networks, vol. 5, Issue 6, Jun. 2012, 658-673.

Opoku, Samuel King, "Performance Enhancement of Large-Size NFC Multi-Touch System", Cyber Journals: Multidisciplinary Journals in Science and Technology, Journal of Selected Areas in Telecommunications (JSAT), (Oct. 2011), 52-57.

Oren, Y., "Attacks on RFID-Based Electronic Voting System", Cryptology ePrint Archive Report 2009/442 (2009). Retrieved from the Internet: <URL: http://eprint.iacr.org/2009/422.pdf>, 21 pgs.

Physical browsing with NFC technology; Heikki Ailisto, Tapio Matinmikko, Juha Haikio, Arto Ylisaukko-oja, Esko Strommer, Mika Hillukkala, Arto Wallin, Erkki Siira, Aki Poyry, Vili Tormanen, Tua Huomo, Tuomo Tuikka, Sonja Leskinen & Jarno Salonen, Espoo May 2007. VTT Tiedotteita—Research Notes 2400.

Programming Android; Zigurd Mednieks, Laird Domin, G. Blake Meike, Masumi Nakamura, O'Reilly Media, Inc., 2011, http://books.google.co.in/books?id=5BGBswAQSiEC&Ipg=PR5&ots=xSfgivFwS& dq=rogue%2ONFC%20active%20tags%20ur1%20phone%20peer%20to%20peer&Ir&pg=PA397#.

QR Code Tech Info: MECARD Format, May 2, 2011.

QRFactory, Redirectable QR, http://dashboard.qrfactory.com/, pulled from the internet Apr. 27, 2012.

Rahnama, Behnam, et al., "Securing RFID-Based Authentication Systems Using ParseKey+", Proceedings of the 3rd International Conference on Security of Information and Networks,_Taganrog,_Russia,_Sept._7-11,_2010,_212-217.

RFID based applications in culture, media and creative industries, 2011 Third International Workshop on Near Field Communication, Eileen Kuehn, Jens Reinhardt, Stephan Bergemann, Prof. Dr. Juergen Sieck.

RFID Inventory Management System. Package Printing, v57 n2, pp. 34. Feb. 2010.

Rieback, M.R., et al., "A Platform for RFID Security and Privacy Administration", Proceedings of the 20th USENIX/SAGE Large Installation System Administration conference (LISA 2006), Washington D.C., (Dec. 2006). Retrieved from the Internet: <URL: htto://www.rfidguardian.org/images/a/a9/Lisa.06.pdf>, 14 pgs.

Rieback, M.R., et al., "The Evolution of RFID Security", Pervasive Computing (Jan.-Mar. 2006), 62-69.

Roland, M., "Security Vulnerabilities of the NDEF Signature Record Type", Presentation from WIMA 2011—NFC Research Track, Monaco (Apr. 19, 2011). Retrieved from the Internet: <URL: http://www.wima.mc/dan/2011/CONF_PDF/TUESDAY/AM/ROLAND.pdf>, 14 pgs.

Roland, Michael, et al., "Digital Signature Records for the NFC Data Exchange Format", Second International Workshop on Near Field Communication, Monaco, Apr. 20, 2010, 71-76.

Sabzevar, A.P., "Security in RFID Systems" Project report for GMU ECE 646 (2004). Retrieved from the Internet: <URL: http://teal.gmu.edu/courses/ECE646/project/reports_2004/SP-4_report.pdf>, 13 pgs.

Sarma, S.E., et al., "RFID Systems and Security and Privacy Implications", CHES 2002, LNCS 2523, B.S. Kaliski Jr. et al. (Eds.) (2003), pp. 454-469, 2003.

Secure contactless mobile financial services with Near Field Communication; Adeola Oluwaseyi Poroye, Aug. 2011.

Simple NDEF Exchange Protocol, Technical Specification, NFC Forum SNEP 1.0, Aug. 31, 2011.

Situated Door Displays and how to interact with them, Barbara Schmid, Jan. 16, 2012.

Smart Poster Record Type Definition Technical Specification NFC ForumTM SPR 1.1 NFCForum-SmartPoster_RTD_1.0, Jul. 24, 2006.

Suh, J., "Introduction to composite electromagnetic noise absorber technology" EMC Directory & Design Guide, (2007), 4 pgs.

Switching the role of NFC tag and reader for the implementation of Smart Posters, 2012 4th International Workshop on Near Field Communication; Dirk Volland, Kay Noyen, Onur Kayikei, Lukas Ackermann, Florian Michahelles.

Thamilarasu G et al: "Intrusion detection in RFID systems", Military Communications Conference, 2008, pp. 1-7.

The "Weak Spots" in Stacked UHF RFID Tags in NFC Applications, IEEE RFID 2010; Xiaosheng Chen, Feng Lu, Terry T.Ye*.

The Junction Protocol for Ad Hoc Peer-to-Peer Mobile Applications; Computer Science Department Stanford University; Ben Dodson, Aemon Cannon, Te-Yuan Huang, Monica S. Lam, Apr. 2011.

The Mobile Phone as Digital SprayCan; Philip Garner, Omer Rashid, Paul Coulton, and Reuben Edwards, Proceedings of the 2006 ACM SIGCHI international conference on Advances in computer entertainment technology Article No. 12, Hollywood, California, USA—Jun. 14-16, 2006.

(56) References Cited

OTHER PUBLICATIONS

Touch-driven Interaction Between Physical Space and Cyberspace with NFC, Longbio Chen, Gang Pan, Shijian Li, Department of Computer Science, Zhejiang University Hangzhou, China, 2011 IEEE International Conferences on Internet of Things, and Cyber, Physical and Social Computing.

Turcu, C. (ed.), Development and Implementation of RFID Technology, In-Teh, I-Tech Education and Publishing KG, Vienna, Austria (Feb. 2009), 564 pgs.

Type 1 Tag Operation Specification, Technical Specification, Technical Specification, NFC Forum T1TOP 1.1, Apr. 13, 2011.

Type 2 Tag Operation Specification Technical Specification, T2TOP 1.1 NFC Forum May 31, 2011.

Type 3 Tag Operation Specification, Technical Specification, Technical Specification, NFC Forum, T3TOP 1.1, Jun. 28, 2011.

Valkkynen, Pasi, et al.,' Suggestions for Visualizing Physical Hyperlinks, PERMID 2006: Pervasive Mobile Interaction Devices—Mobile Devices as Pervasive User Interlaces and Interaction Devices, Dublin, Ireland, May 7, 2006, 245-254.

Varshney, L.R., et al.., "Securing Inductively-Coupled Communication", Information Theory and Applications Workshop (ITA) (Feb. 5-10, 2012), 6 pgs.

Vidano, R., "13.56-MHz Inductively Coupled Card Compatibility to Conducting Surfaces", Proceedings of Asia-Pacific Microwave Conference (2007), 4 pgs.

Violino, Bob. A Summary of RFID Standards. RFID Standards. RFID Journal. Jan. 16, 2005. URL at http://www.rfidjournal.com/articles/view?135.

Wang, J.J.H., "Spiral Antennas in RFID and Their Size Reduction and Performance Enhancement", 2007 IEEE International Workshop on Anti-counterfeiting, Security, Identification (Apr. 16-18, 2007), 44-47.

Wegleiter, H. et al., "Automatic Antenna Tuning Unit to Improve RFID System Performance", IEEE Transactions on Instrumentation and Measurement, vol. 60, No. 8,(Aug. 2011), 2797-2803.

Weis, Stephen A, "Security and Privacy Aspects of Low-Cost Radio Frequency Identification Systems", Security in Pervasive Computing 2003, LNCS 2802, D. Flutter et al. (Eds.) (2004) 201-212.

Yamada, I., et al., "Secure Active RFID Tag System", Ubicomp2005 Workshops, 5 pgs.

Zhu, H., et al., "Solutions of Metal Surface Effect for HF RFID Systems", 2007 International Conference on Wireless Communications, Networking and Mobile Computing (WiCom), (Sep. 21-25, 2007), 2089-2092.

Partial European Search Report dated Aug. 7, 2017 for European Application No. EP17000461 filed Mar. 21, 2017.

* cited by examiner

APPARATUS, SYSTEM AND METHOD FOR CONSUMER TRACKING CONSUMER PRODUCT INTEREST USING MOBILE DEVICES

CROSS REFERENCE TO RELATED APPLICATION(S)

The present application is a division of U.S. Utility patent application Ser. No. 13/600,692 filed Aug. 31, 2012, which claims priority to and the benefit of U.S. Provisional Patent Application No. 61/530,387 filed Sep. 1, 2011, each of which is incorporated herein by reference in its entirety.

BACKGROUND OF THE INVENTION

The use of radio frequency identification (RFID) tags to track, identify and locate goods has grown significantly in recent years. RFID tags allow manufacturers, distributors and retailers, amongst others, to regulate products and inventory, quickly determine production, manufacture, distribution or retail needs and efficiently intake and remove items utilizing RFID tags from inventory or other supply chain situation. The RFID tags themselves can provide any desired product data and may be scanned or read in any of a variety of manners through the use of any device that has a reader or scanner.

Near-field communication (NFC) is a type of radio frequency communication technology, operating at about 13.56 MHz and at bandwidth of about 2 MHz, which allows for read-only and read-write communications between a NFC-enabled RF tag reader and a NFC-enabled tag. NFC operation is based on inductive coupling between two loop antennas, which allows for sharing of power and data between NFC-enabled devices. Typically, for proper operation, the distance between a NFC-enabled reader and a NFC-enabled tag needs to be under about 20 centimeters.

In certain situations, for example when a consumer is shopping, they may desire to learn more about a product. Such information typically has to be read from a product label, such as through visual indicia or messages, which may not have all of the desired information a consumer requires and typically cannot be changed easily, for example to target a specific type of consumer or reflect a change in the product, such as a change in price or other promotion. In order to make a change, the entire message has to be replaced, or over labeled with the new message, that is concealing the underlying message by applying a label over the message with the new indicia.

SUMMARY OF THE INVENTION

According to at least one exemplary embodiment, methods, systems and apparatuses for communication may be shown and described. These can include the use of near field communications (NFC), for example a NFC RFID tag that is able to communicate with a NFC-enabled device, for example a mobile device, smart phone or any other device having a scanner or reader, e.g., a PC or a tablet. Further, any number of NFC RFID tags may be associated with any desired products, allowing NFC-enabled devices to read or scan the NFC RFID tags and access data or information provided by the NFC RFID tags, which may be associated with products optionally coupled to the NFC RFID tags. Thus, one tag can be associated with a single product or multiple tags can be used with multiple products or multiple tags on a single product with each tag offering potentially different information or different levels of the same information or service.

The invention relates to a system and method for simplifying the installation of a mobile application using a tag/code—such as a NFC tag or QR code—and reusing the tag/code to retrieve additional information. This additional information can come from the tag/code itself or from a web server. The method allows the user to first scan the tag/code with a generic preinstalled application. The main purpose of this first scanning/decoding step is to retrieve general information about the most appropriate application to display additional content, and to provide a web link (e.g., a web page, web store, etc) to download the application. This new application—after it is downloaded and installed—can subsequently be used to scan the same tag/code and retrieve additional content and present it correctly to the user. In this sense, the tag/code is a multi-purpose identifier which adapts to the user behavior. Only the first scan with a generic decoder presents the installation link. Subsequent scans of the same tag/code using the new application present useful content such as enriched text, audio, video, URL, user profiles, etc.

Since the method allows any generic application to decode only certain parts of the content that is assigned to the tag/code, it is always necessary to use or download the new application that is capable of retrieved the rest of the content. This also serves the purpose of always giving preference to the application that is best suited for displaying the content correctly as opposed to a generic application. This method is also a powerful marketing strategy that drives user adoption of a particular application.

In order to be able to apply this method, the tag/code or identifier needs to support multiple fields. If it is necessary to support a multi-platform approach (running on different devices and possibly operating systems), at least one of the fields is utilized to always present the same installation URL. This URL (e.g., a web page) can be automatically re-mapped to specific link or portal that would adapt depending on the device or OS that is accessing it (i.e., URL remapping). However, it never changes on the tag itself, only when it is accessed by the decoding device. For example, the field on the tag is http://www.mtsinstaller.com, and it is remapped when viewed on the web browser to http://android.mtsinstaller.com if it is accessed from an Android device.

The second field that needs to be present is the tag/code unique identifier. This is required if additional content needs to be retrieved from a web server in order for the server to know which additional enriched content needs to be sent back to the application that is requesting it. The unique id (e.g., MTSIDCONTENT0001) which may be following a specific pattern can also be used to verify that the tag/code has a valid id and will not be redirected to a malicious site or application. It also assures that the tag/code will be supported by the application.

BRIEF DESCRIPTION OF THE FIGURES

Advantages of embodiments of the present invention will be apparent from the following detailed description of the exemplary embodiments. The following detailed description should be considered in conjunction with the accompanying figures in which.

DETAILED DESCRIPTION OF THE INVENTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

It is often necessary to create mobile applications that are capable of displaying the right data at the right time. This data can be retrieved by the software that scanned the tag/code, or can be downloaded from a server with the help of a different application.

Even though the user would best experience the enriched content with an application that is suited to best present it with the correct format and layout; it is often the case that the application is not present or installed on the mobile device. In addition, the user may not even be aware of such application, and in many cases only that particular application would be able to retrieve additional content and display it appropriately. This is a great limitation because the user would have to figure out where the application can be obtained, or at least remember the name to search for it. The current invention solves this problem in a generic way. It allows the user to first scan the tag/code with a generic preinstalled application just to be able to find a link to download the most suited application. This new application can subsequently scan the same tag/code to retrieve additional content and present it correctly to the user.

The NFC tags and QR codes are encoding information is such a way that it is possible to use part of the information to advise the user where to download the MTS application. Once the MTS application is downloaded and installed, since only MTS application can contact the MTS server and display additional content obtained from the server, the MTS retrieves content and displays it appropriately.

Figure 1:
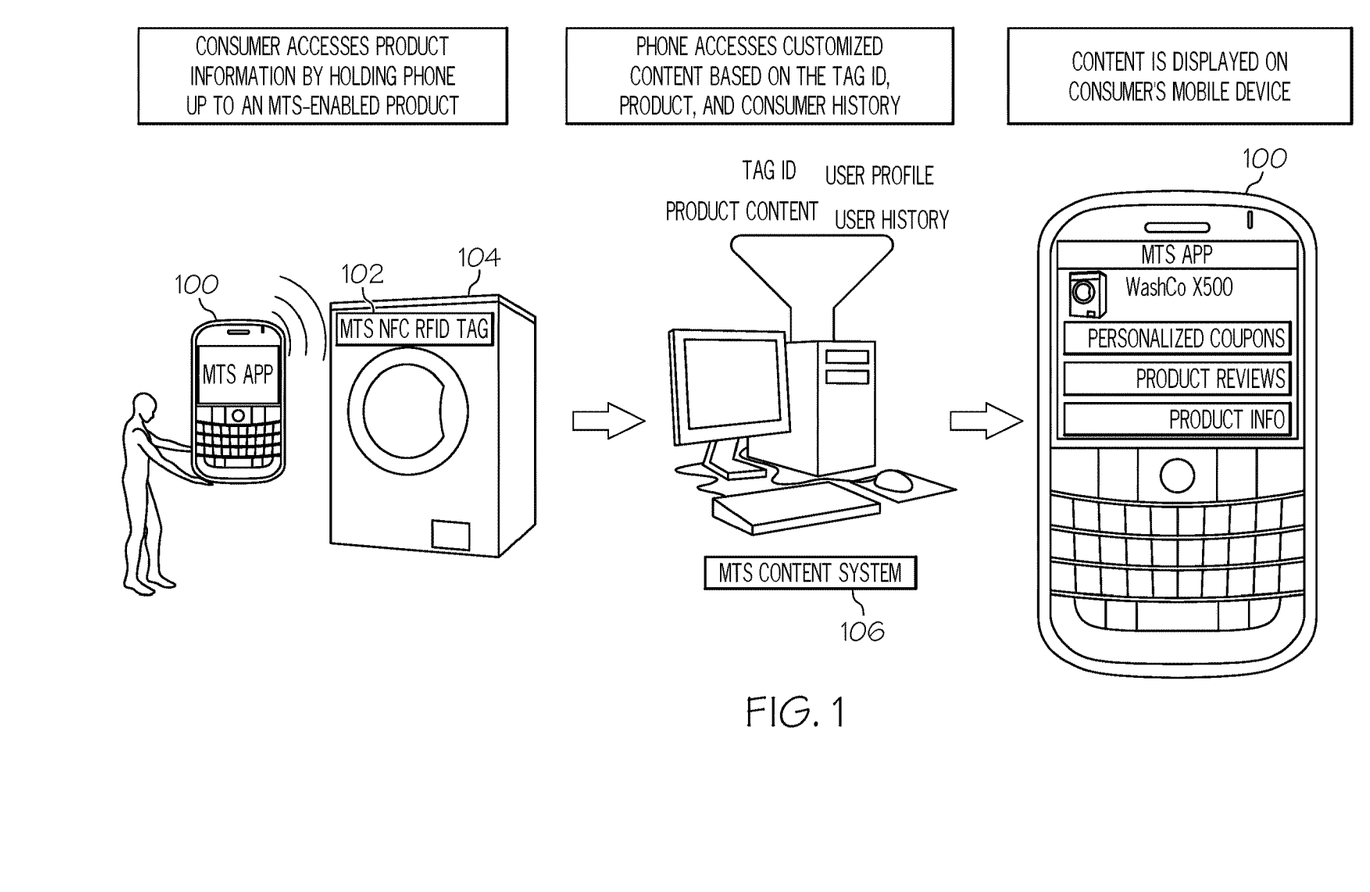
FIG. 1 shows an exemplary embodiment of a communication system.
Figure 1A:
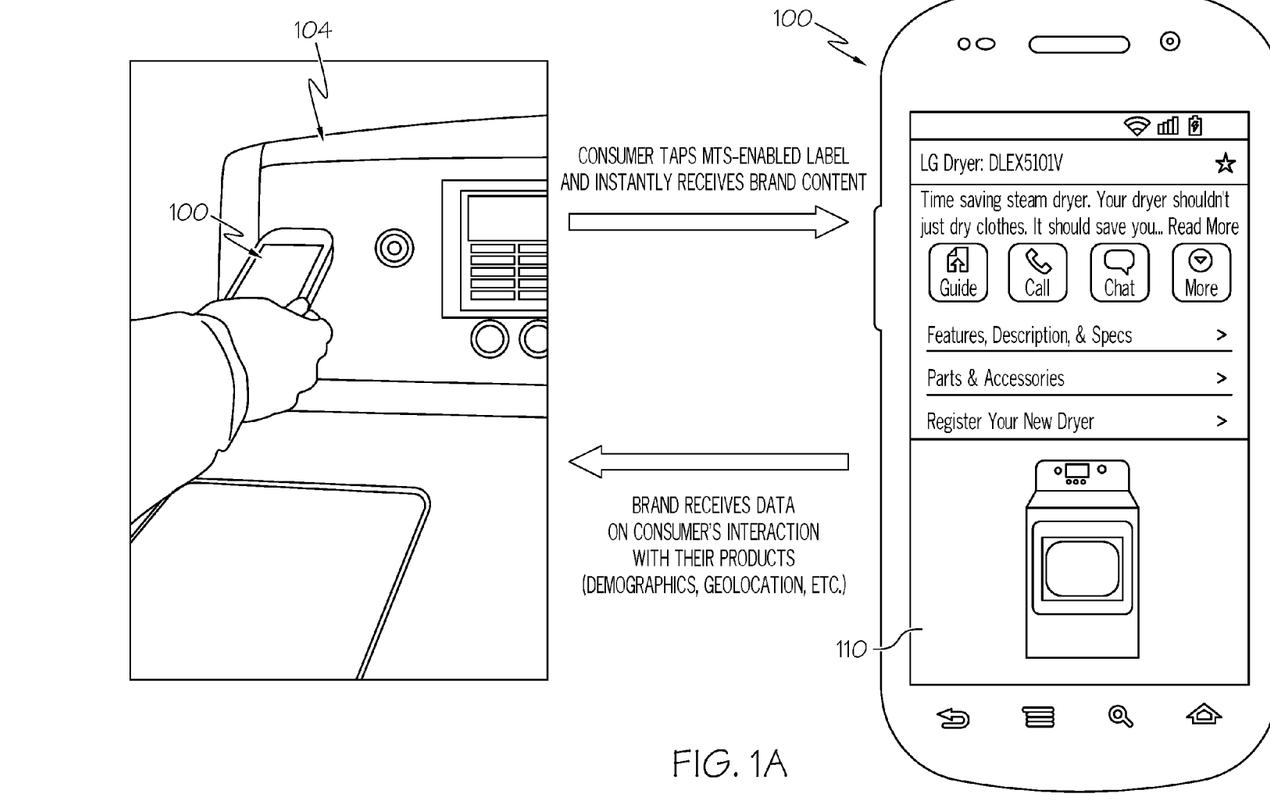
FIG. 1A shows a further exemplary embodiment of a communication system.
Figure 2:
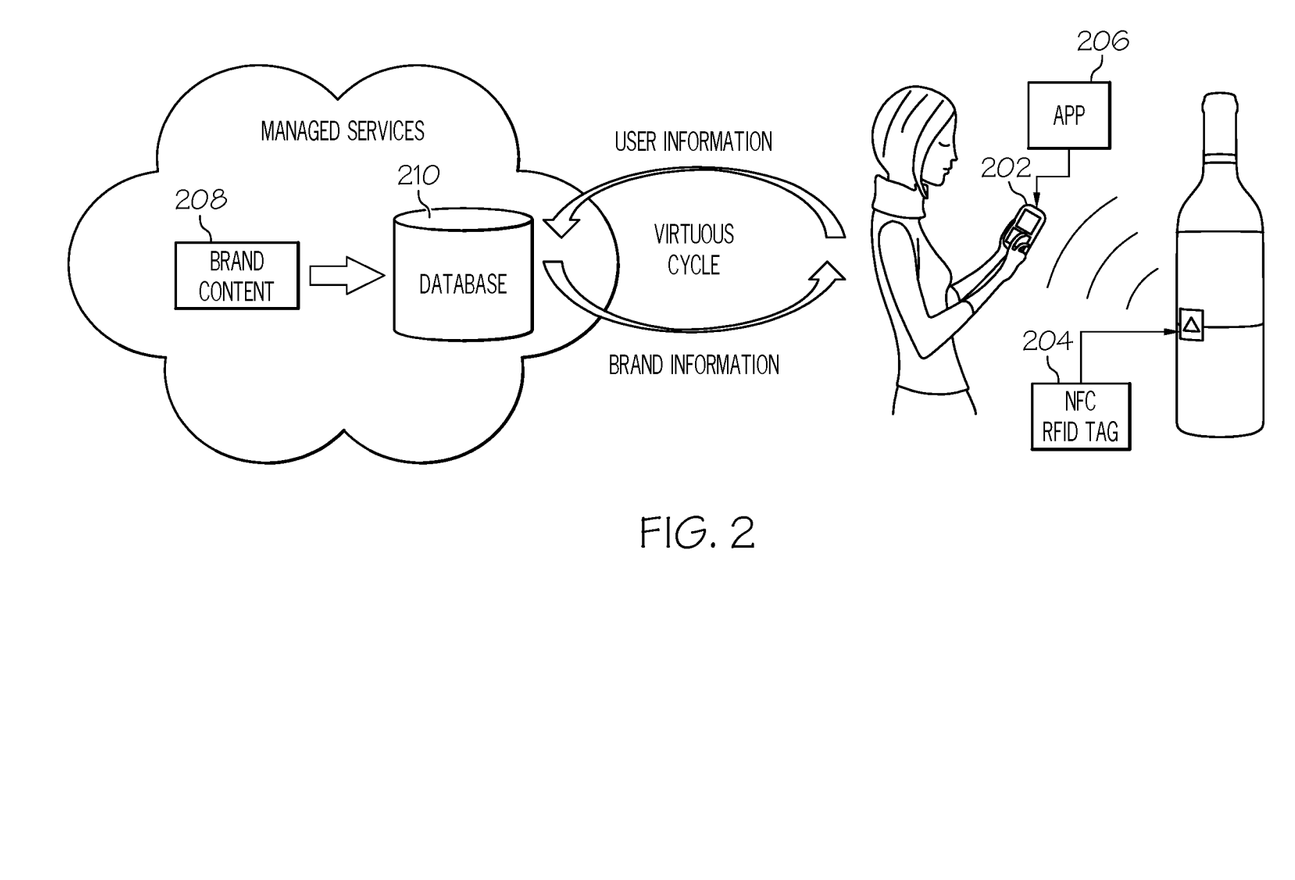
FIG. 2 shows another exemplary embodiment of a communication system.
Figure 3:
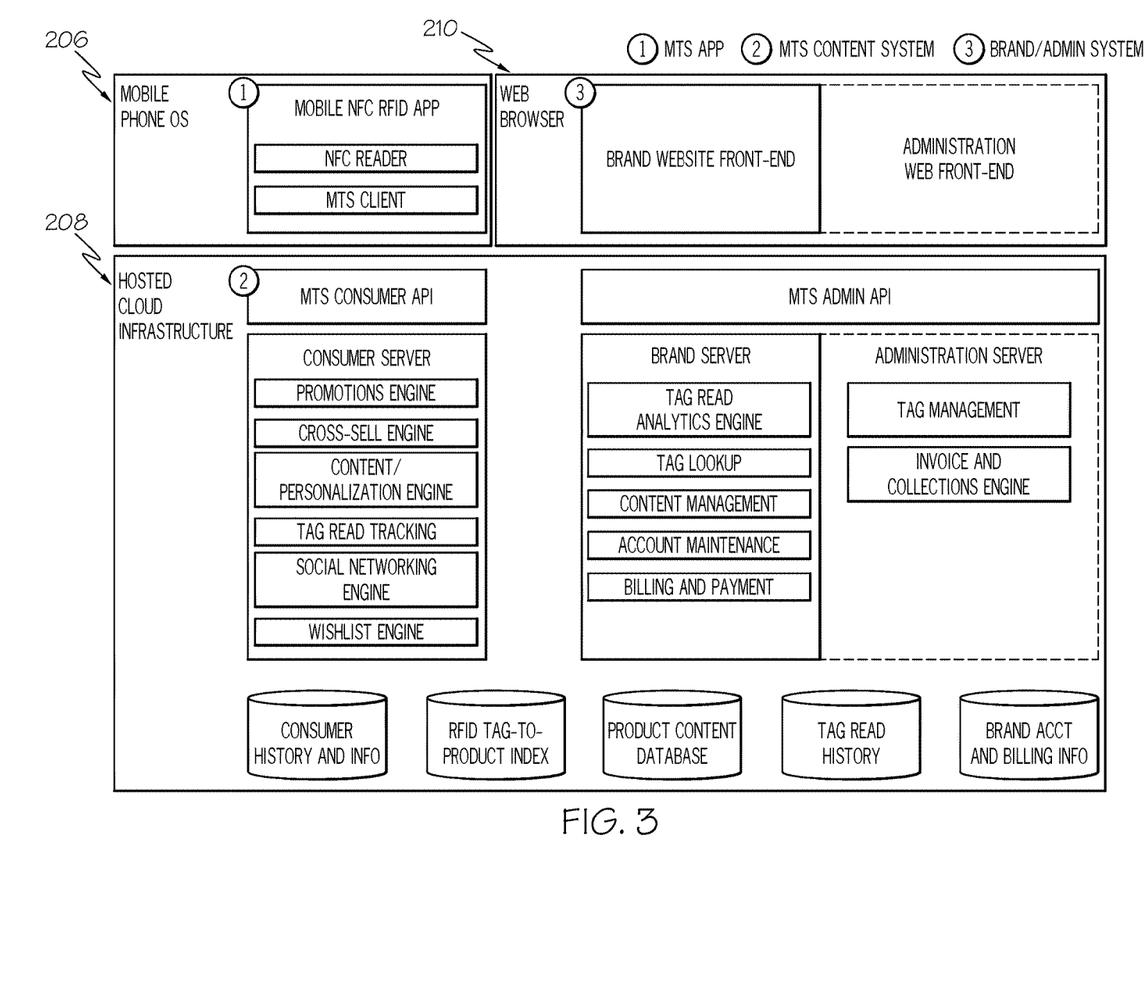
FIG. 3 shows still another exemplary embodiment of a communication system.

Referring generally to exemplary FIGS. 1-3 and the associated descriptions, methods, systems and apparatuses for data transfer and communication may be described. Exemplary embodiments utilizing data transfer may allow for the transmission of data from a device, such as a radio frequency identification (RFID) tag or other device capable of transmitting data, for example utilizing near field communication (NFC), such as a NFC RFID tag. In some further exemplary embodiments, a mobile device, which may be a mobile phone, a smart phone, tablet, PC or other device with a scanner or reader, may be capable of reading a NFC RFID tag, collecting information and data from the NFC RFID tag, and redirect a user of the mobile device to a website, software application or application store.

Still further exemplary embodiments can involve an application, such as a software application used on a mobile phone or portable device that may collect information from one or more online sources that may be linked to a serial number encoded on a NFC tag. Also, some exemplary embodiments may allow for NFC RFID tags to transmit any desired data, as well as manners of providing and administering any desired data associated with NFC RFID tags and/or a software application used in conjunction with NFC RFID tags. Other embodiments may include a website address provided by the NFC RFID tag and providing NFC RFID tags with varying levels of memory which will be able to provide the user with additional information and details relating to a particular product or service.

In one exemplary embodiment and according to FIGS. 1 and 1A, a NFC-enabled smart phone 100 may communicate with a NFC tag or NFC RFID tag 102 associated with a product 104. It should however be understood that this is an exemplary embodiment and any other device can be used that has a scanner or reader associated with the device. Such communications may be collectively described as mobile touchpoint solutions ("MTS"). MTS, as used herein, may be a non-limiting term that broadly encompasses methods, systems and apparatuses associated with the reading, writing, organization, collecting, distributing and use of data associated with NFC RFID tags and NFC-enabled reading devices. MTS or MTS-style systems can, for example, bring dynamic online content 106 to a static product label. MTS or MTS-style systems may also be utilized with barcodes and barcode reading devices or other codes or symbology.

A MTS system can utilize NFC RFID tags, such as NFC RFID high frequency labels, to allow brands to communicate with customers through mobile devices, for example mobile phones, smart phones or any other device that can read a tag, e.g., a tablet, PC or device with a reader/scanner. Exemplary NFC RFID tags for use with the present invention are available from Avery Dennison RFID Company of Clinton, S.C. When used herein, the term "tag" can refer to an inlay in which an antenna and chip are placed on a substrate (PET, paper, etc.) and may be covered by a second substrate to encase the antenna and chip or only portions thereof. The inlay may be provided with adhesive or "dry" with no adhesive. In addition, a tag may refer to a hang tag such as found with apparel items, a label which may be applied to a surface, or other structure which may be used to hold, contain or retain the NFC RFID device.

In one exemplary embodiment, a mobile phone or portable device 100 user, who may be a consumer, can "tap" or otherwise position their NFC-enabled phone 100 proximate to a product 104 labeled with a NFC RFID tag 102 to access product information, as shown in exemplary FIGS. 1 and 1A. It should be understood, that while the present invention is directed to consumer or commercial applications, the presently described invention may also be used for compliance and monitoring purposes, or any other use where it may be helpful to download data.

The NFC-enabled phone or device 100 may also have a software application associated with NFC reads, as described in more detail below. Any such information may then be received by the NFC-enabled phone or device 100 and displayed thereon or transmitted to another device or location for display, for example on a display showing product information on MTS software application 110. In such exemplary embodiments, a MTS system may be set up on behalf of a brand and/or retailer, NFC tags may be supplied to a brand and/or retailer and have data housed thereon and communication may be enabled between the NFC tags and a NFC-enabled device. Further, fees may be associated with any part or all of a MTS process, for example, for the preparation and supplying of the tags and for the communication between a tag and a NFC-enabled device or collecting a charge, such as a click charge, each time a device is used, a site is visited or tag is read. However, in other exemplary embodiments, some aspects may be provided free of charge, for example a consumer's use of MTS. Additionally, MTS may be utilized with any type of products, brands, or retail applications in any type of field. The MTS system of the present invention may also be used to provide public service information such as bus routes and times, health care information, such as location for flu shots, retailer information, and the like.

In further exemplary embodiments, a MTS system can fulfill a desire to engage consumers and information seekers both at a point of purchase and at desired points in products' lifecycle(s) or service intervals. For example, as a significant number of consumer purchases are made in brick and mortar stores, consumers may use a MTS system to gain information, for example product information, product content, price information, product comparison information, product availability information, sale information, warranty details and service locations, and/or coupon information about products as they shop. In addition, social networking sites, peer reviews and other interactive user or participant sites can be used to provide information. Such information may be a determining factor in whether or not a consumer chooses to purchase a certain product or service. Also, users of a MTS system could share any desired product information directly with other parties or select groups, purchase a product online, share product information on a social network and otherwise receive, transmit or communicate data related to a product or service, for example through use of MTS software application 110 and any desired network, for example the Internet. Additionally, unlike some store or product websites (full websites or mobile websites, for example), any information provided by a MTS system can be targeted, as desired, such as through a particular demographic, age, sex, geographic location, etc. Further, the information provided through a MTS system may be varied, changed or adjusted as desired and can be updated as required. For example, data read from a NFC RFID tag associated with a product or service may be specific to a store where the product is located or a service can be received, a geographic region, a demographic of a user reading the data or any other factor or combination of factors, as desired. For example, brands utilizing a MTS system can control the content available from the NFC RFID tags. Also, MTS system capabilities may be available for consumers both pre-purchase of a product with a NFC tag as well as post-purchase. This can allow a brand to deliver content, such as, but not limited to, product information, promotions and coupons, as well as after-sale support, for example opportunities to purchase extended warranties for durable goods and registering goods with a brand or manufacturer.

In other exemplary embodiments, NFC RFID tag 102 in a MTS system may have a unique identifier (UID) that is related to a specific or individual product or service offering. This may be beneficial, for example, when, after purchasing, a consumer registers the product or purchases a warranty for the specific product or selects service or appointment dates for the service. Additionally, the ability to use unique identifiers may allow for additional levels of security and authentication, for example allowing a brand or consumer to determine if a product is authentic. Also, still further exemplary embodiments may allow for NFC RFID tags 102 to have read-write capabilities. For example, NFC RFID tags 102 may be such that they only provide data to a consumer when read. However, as desired, a tag may allow for writing so that a consumer can write information to a tag 102.

Other exemplary embodiments of a MTS system may allow for the utilization of NFC RFID tags 102 that are designed to a brand's specification such that the tags 102 amplify the look and feel of the brand image and do not detract or otherwise take away from the brand's representation. Thus, tags 102 may be formed in any shape and size and may incorporate any design, or trademark for example an aesthetically pleasing design or design that draws the attention of a consumer. Alternatively, NFC RFID tags 102 may be hidden or otherwise not readily apparent, and the product itself or a label on a product, such as product 104, can indicate that additional product information can be gained by using a NFC-enabled device, such as a mobile phone or device, at, around or proximate a location on the product 104.

Referring to exemplary FIG. 2, a MTS system may function in any of a variety of manners. In one exemplary embodiment, consumers may utilize a MTS system to use a NFC-enabled mobile phone or device to read a product's NFC RFID tag 204 and access content linked to that tag using a MTS software application 206. Brands can utilize a MTS system to provide customized content to be accessed by consumers who use a MTS software application. Brands can further have access to data and analytics on consumer use of a MTS system related to the brands' products. For example, brand content 208 can be provided by a brand and any data associated with NFC RFID tag 204, such as scan times, location, consumer information, product information and the like, and can be housed on database 210. Further, as shown in exemplary FIG. 2, user information may be transmitted via MTS software application 206 to database 210 and database 210 may provide desired content to a user through software application 206. Such data transfer may take place over any available or desired network. Additionally, in some exemplary embodiments, barcodes can be utilized in place of or in concert with NFC tags on products or related to services.

When the NFC RFID tag is used with a service, the tag can be affixed or part of a brochure, pamphlet, mail piece, sign, or the like which advertises, markets or displays information about a particular service.

A MTS system can utilize any number of components, as shown in exemplary FIG. 2. For example a MTS software application 206 may be utilized. MTS software application 206 can be a front-end consumer user interface to access a MTS system via a mobile device, such as a mobile phone or portable device 202, and may function similarly to any desired software application or "app" or mobile website commonly used on smart phones. A MTS content system 208 may also be utilized, as discussed above. The MTS content system 208 can be a web server infrastructure that can provide MTS content to a MTS application. Additionally, a database may house data and information related to a brand/administration system 210 that may be utilized. Select data can also be stored locally on the mobile or other device.

The brand/administration system 210 can be a web interface and supporting server infrastructure that can allow brands and outside parties to manage MTS systems. Hosting or providing of a MTS system may be accomplished with a cloud infrastructure or any other manner, as desired.

A MTS software application 206, as described above, may be housed on a mobile device, such as a mobile phone 202. The software application can include the ability to utilize a NFC reader as well as act as a MTS client, for example receiving brand content 208 and providing data to a database associated with brand/administration system 210. Use of the MTS software application 206 can, in general, allow for a user to access a brand website, access content, such as product information, or access any other desired data in any available network location. Additionally, use of MTS software application 206 can be monitored by a brand and/or MTS system administrator, as desired.

In still further exemplary embodiments, consumers can access brand content through a MTS system. As discussed previously, a MTS software application 206 can be downloaded onto a mobile phone or other portable device through any known manner. Following activation of the device, which can include some form of registration, a consumer or information seeker can enter any desired information, including demographic information, location information and loyalty card or credit card information, which can enhance the functionality of the MTS software application 206. Next, the consumer can utilize the MTS software application 206 to read a product's or service's NFC RFID tag ID. The MTS application may then use the tag ID, or other tag-specific information or data, to retrieve relevant or appropriate product content from the MTS system. This content may then be displayed on the display of the mobile phone or device, as desired.

Exemplary information that can be provided through the use of a MTS application includes, but is not limited to, product information, such as marketing copy, product specifications, nutritional information, product data, user guides, warranty information or instructions, live chat with sales and/or service personnel, links to company or product websites, promotions, such as coupons (pre-sale and post-sale), up or cross-sell among other products offered by a brand, cross-brand advertisements and loyalty program information, loyalty program registration, promotion registration, social engagement, such as product reviews and customer feedback, feedback input, endorsement of products on social networks, and friend referrals, service and support, such as warranty registration, product registration, service records, contact information for service centers and service schedulers, consumer dashboards, including wish lists, loyalty program preferences and consumer homepage with inventory of owned and favorite products, as well as online ordering particularly but not limited to retailer-owned brands.

Referring now to exemplary FIG. 3 as well as exemplary FIG. 2, a MTS content system 208 can further include web server infrastructure that can provide MTS content to the MTS software application 206. A content system 208 can include a consumer application programming interface (API) and a consumer server. The consumer server may house a promotions engine, a cross-sell engine, a content/personalization engine, tag read tracking, social networking engine and wish list engine, amongst any other desired engines or content. Further, the MTS content system 208 can have a brand server that can have a tag read analytics engine, tag lookup ability, content management, account maintenance and billing and payment capabilities. In such exemplary embodiments, the promotions engine can utilize logic to offer targeted promotions and offers to a consumer based on NFC RFID tag reads, demographics, history and other information, as desired. A cross-sell engine can utilize logic to cross-sell products to consumers based on NFC RFID tag reads, consumer demographics, history and other information, as desired. A content/personalization engine can utilize logic to determine product content to be displayed when a NFC RFID tag is read. A tag tracking component can utilize logic to maintain a record of NFC RFID tags read by a consumer, at what time, at what location and other similar information or queries, as desired. A social networking engine can provide logic and an interface to interact with social networking sites, for example Facebook®. A wish list engine can utilize logic to maintain a record of consumer product wish lists and favorites. Additionally, consumer server content may be available through MTS software application 206 and not necessarily through a web browser, although this may be varied or customized as desired. Additionally, any of consumer history and information, an RFID tag-to-product index, a product content database and tag read history may be utilized by any other component of a MTS system as described herein.

A MTS system can also have a brand/administration system 210 which can utilize, for example, an administration server. An administration server can allow for tag management and invoicing, billing and collections capabilities from an administrator to a brand. Further capabilities of the MTS system can include the housing and ability to review consumer history and info, a NFC RFID tag-to-product index, a product content database, tag read history and brand account and billing information. Other tools available to an administration system include, but are not limited to, a brand server that can have logic to provide content to a brand website, mobile app, mobile website, or other front-end. This can include a tag read analytics engine that has logic capable of pulling data related to a particular brand's NFC RFID tags and allowing for data filtering and analysis, tag lookup capabilities that include logic to reference NFC RFID tag data and product mapping information, content management systems that include logic to control the content mapped to a particular NFC RFID tag ID, particular consumer, and/or particular device, account maintenance, which can include logic to update brand account information, and bill and payment capabilities, which can include logic to determine, for example, cost per click and fixed fees, along with bill-pay capabilities. Further to the above, an administration server can have logic that can provide content to an administrative web front-end, tag management capabilities and other administrative capabilities, as desired.

In a further exemplary embodiment, a MTS administrator may provide physical NFC RFID tags for brands, develop a MTS application specific to a product, service or brand and administer the data that is exchanged between consumers reading NFC RFID tags and brands. Additionally, as described herein, brands may have access to any of a variety of data generated through communications between brands and consumers. For example, after the downloading of a MTS application 206 by a consumer and the consumer 'tapping' or otherwise positioning their phone proximate a NFC RFID tag to access product content, a brand associated with the product or service can see any desired information about that consumer and the content they viewed, as well as the time spent viewing the content, amongst other types of data. A brand may also be able to read, store and analyze any other information associated with a MTS application 206, which can include any user-inputted data. A MTS administrator may be able to collect fees for such data management and report generation which may then be used with other applications or sold to other brand owners. In addition, the reporting feature may be used to further develop demographic marketing information which can then be used for further targeted applications.

In further exemplary embodiments, a MTS system can be developed and set up in any of a variety of manners. NFC RFID tags may be manufactured, assembled into an inlay, written with tag identification data, mapped to a physical object or product, and have the mapping data stored in a database, for example the database associated with brand/administration system 210. The tags may then be associated or coupled to any desired products or services, for example through the use of adhesive, mechanical fasteners (e.g., hook and loop fasteners, rivets, ties, etc.) or otherwise integrating it into product packaging or product itself, similar to uses of RFID tags, inlays and labels. The NFC RFID tag can be placed adjacent to, beneath or otherwise associated with a bar code label. Also, during this process, product or service content can be uploaded to a MTS system from the tag which may also be encoded during the placing or associating with the object or offering of the service. This can include populating content templates, customizing brands' content as desired, creating logic to personalize or target the content, map the content to a specific tag and input all content and logic into a MTS system. After a NFC RFID tag is read by a mobile device, or other device having a scanner or reader, the appropriate data may be transmitted encrypted or not from a server to the mobile device and appropriate data may be transmitted encrypted or not from the mobile device or portable reader to a server.

In further examples, brands can be able to update content linked to a particular NFC RFID tag in any desired fashion, for example manually through a brand/administration system 210, as described above, or through an appropriate outside party. Brands can also have access to a MTS dashboard or interface that can provide NFC RFID tag-read data cuts by time, region, customer demographics or any other available measure or type of data.

Further, any MTS system content provided by a NFC RFID tag may be personalized, customized or targeted for a consumer or information seeker. Content may be changed, for example, using content system 208, brand/administration system 210, or any combination thereof. Such personalization, customization or targeting can be made using data, including past NFC RFID tag reads, known purchases personal information inputted into MTS software application 206 and/or product loyalty cards/club registrations. For example, content personalization can include personalized marketing communications, improved promotion targeting and user-specific service recommendations.

In still further exemplary embodiments, a MTS system may be utilized to generate revenue in any of a variety of manners. For example, brands who may be customers of a company who is administrating a MTS system, for example using brand/administration system 210, may provide payment on a "per click" basis, for example every time a consumer with a mobile or portable device accesses the system and/or specified content in the system by using a NFC-enabled mobile device with a NFC RFID tag, label or inlay associated with a product. In other exemplary embodiments, revenue may be generated by any other known manner, for example a pay-per-seat arrangement, a pay-per-user arrangement, a pay-per-transaction arrangement or a pay-per-memory-required arrangement. Still other revenue streams may include, but are not limited to, value-added data analysis of tag-read data for individual brand owners, data analysis and reports using aggregate data across brands, and consulting services informed by tag data insights. Such analysis, reporting and consulting may be performed by a party associated with brand/administration system 210 or any outside party, as desired.

In other exemplary embodiments, a MTS system can provide for an enhanced user or consumer experience. While known methods, such as UPC barcodes, currently can be used to convey product information, consumers or information seekers generally do not desire to scan a barcode as it requires line of sight that is the bar code must be clearly visible to be scanned. In addition, bar codes and other symbology can fade or become unreadable due to environmental conditions. In order for a mobile device to scan a barcode, it typically must have a camera and an associated application that must be activated. Then the consumer typically must take a picture of the barcode or at least focus the camera on the barcode in order for it to be decoded. Referring back to exemplary FIGS. 1 and 1A, a MTS system can transmit data using NFC, thus eliminating the need to activate and focus a camera of a mobile device on a NFC RFID tag 102 or label associated with a product. A MTS system can also read barcodes or other codes or symbology as desired.

A MTS system can also allow for greater brand control. As mentioned above, UPC barcodes are commonly utilized with products, but UPC is an open standard, which prevents brands from controlling product-specific information or from targeting data towards consumers. Additionally, brands cannot control or have access to data scanned from the barcodes. In a MTS system, a brand associated with a product or service can control any information conveyed by a NFC RFID tag. Additionally, the brand can control if any other software applications may have access to the data whether on the NFC RFID tag or in other elements of the MTS system besides a targeted software application approved by the brand.

In an exemplary embodiment of the present invention, a NFC RFID tag can be attached or incorporated into a wine label that appears on a bottle of wine or case of wine. The user taps the mobile or portable device to the label and is immediately directed to a website with information about the producer of the wine. The user may then be able to select a video which illustrates how the wine is made. In addition, a user can select food pairings and other serving selections relating to the wine. The user may be able to order the product direct from the manufacturer where permitted by law and be added to a wine club through which the user will receive regular updates about new releases and product offerings. The user may also be given the opportunity to select peer review information and to share information on a social networking site. The user can be presented with a coupon relating to the future purchase of the wine where permitted by law or a related food pairing opportunity.

This method will be used to drive user adoption of MTS application without having to rely on other strategies which may not be as effective as this direct installation path.

If an NFC tag is used, one of the formats that can be used to support multiple fields is a Smart Poster. A smart poster has multiple fields. At least it has a URL. This URL is the installation URL that was described above. The smart poster also has a title field. The title is used to specify the unique identifier that is needed by the server. Other fields and combinations can be used to achieve the same functionality. The smart poster format has a special computer byte encoding. However, as long as it is properly encoded and specifies both the URL and the title that are reused for the installation and unique id, the method works correctly.

If a QR code is used, one of the formats that can be used to support multiple fields is a MECARD. This is a virtual business card that has multiple fields. Among these fields there is a URL. This is used as the installation URL. The MECARD has many other fields. One field that is generally skipped in the format is a NICKNAME. The invention takes advantage of this fact and reassigns the unique ID—needed by the server—to the NICKNAME field. This is an example:
MECARD:N:MTSNFC Demo;URL:http://market.android.com/details?id=com.mts. demo.installer;NICKNAME: MTSIDCONTENT0001;.

Figure 4:
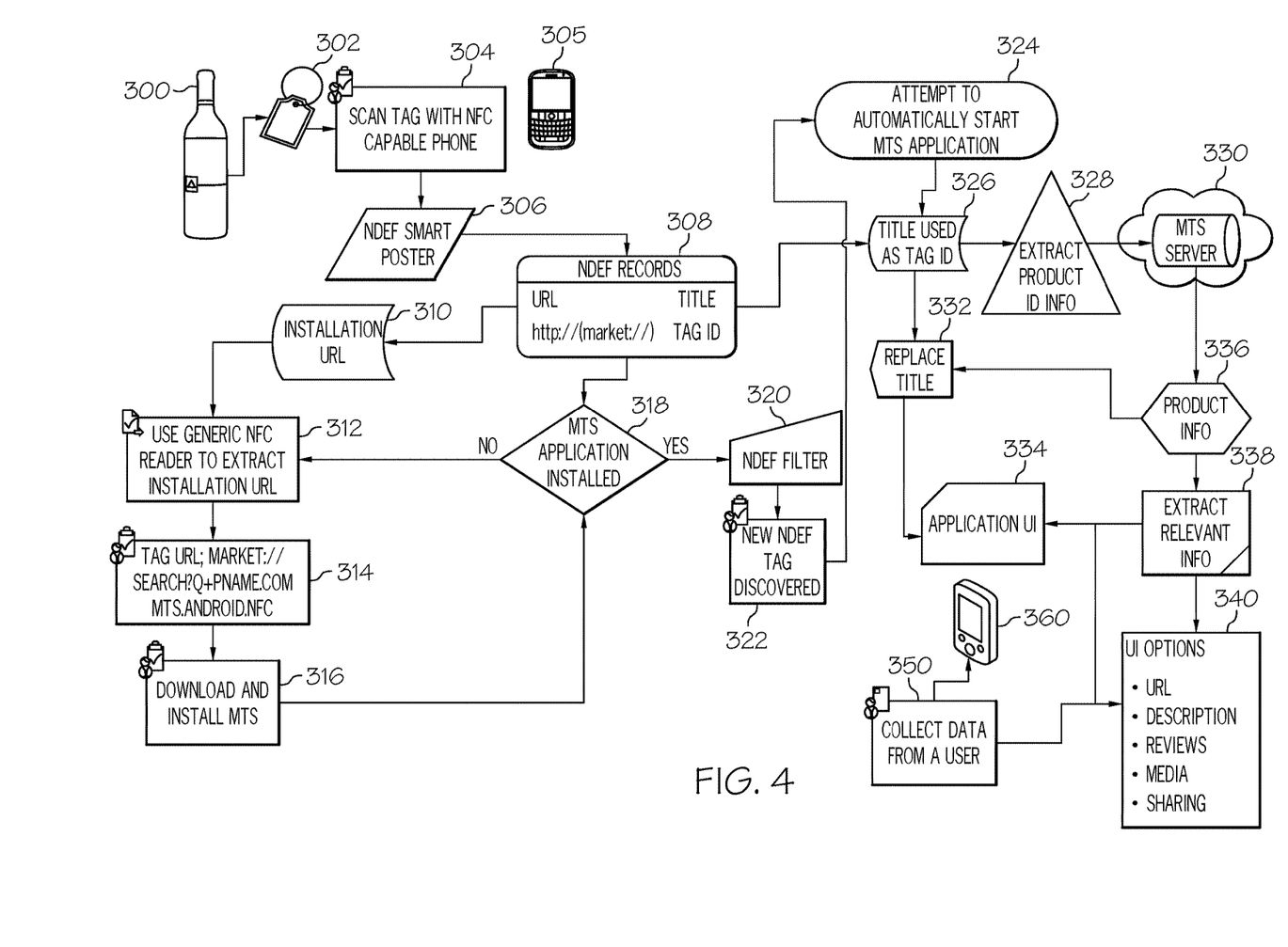
FIG. 4 provides a flow diagram providing another exemplary embodiment of a communication system.

Turning now to FIG. 4 a flow diagram is provided showing an exemplary application as described above. A wine bottle 300 having a NFC RFID tag 302 which may be hung for example around the neck of the bottle 300. Alternatively, the NFC RFID device may be incorporated into the label itself or positioned beneath the label or applied over the label. The tag 304 is scanned using a mobile or portable device 305. NFC data exchange format (Ndef) content is displayed as a "smart poster" 306 and contains information such as a URL or title as part of the data payload at 308. The URL can then be installed at 310 on the portable device 305 and the user or device is instructed to extract the URL installation at 312. If the URL is enabled, additional data is provided at 314 and the download and install begins at 316. If problems result then a message is generated that a MTS application needs to be installed at 318 and the process is repeated, if necessary.

Continuing with a discussion of the present embodiment, the Ndef is filtered at 320 and presence of the Ndef tag discovered at 322. Next, the device will attempt to start the application at 324. The title of the application may also be used as the NFC RFID tag 326, which may be received directly from the Ndef records 308 or when the tag has been discovered once the application has been installed. The title may be changed or replaced at step 332. Next, the data on the product or service is extracted at 328 and retrieved from a data base or cloud 330 and the product or service information transmitted at 336. Additional information is extracted at 338 via a user interface (UI) application 334. The UI can provide a number of additional options at 340 and usage data can be collected from a user at 350 from a mobile device 360.

The foregoing description and accompanying figures illustrate the principles, preferred embodiments and modes of operation of the invention. However, the invention should not be construed as being limited to the particular embodiments discussed above. Other example embodiments of the invention pertain to a wide range of products, for example but not limited to: wine, spirits, beer, other beverages, health and beauty products such as shampoo, conditioner, hair coloring, lotions, creams, makeup, over-the-counter drugs, prescription drugs, nutraceuticals, wound care, braces and supports, other health and beauty products, appliances, consumer electronics, consumer packaged goods such as salad dressing, condiments, etc., gourmet foods, organic foods, specialty foods, automobiles and automotive products, etc. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for mobile touchpoint solutions comprising:
at least one unique identifier (UID) related to at least one content element;
at least one radio frequency identification (RFID) tag containing the at least one UID;
at least one server storing the at least one content element related with the at least one UID; and
a portable device that decodes the at least one UID by reading the at least one RFID tag, accesses the at least one server as decoded from the at least one UID and receives the at least one content element from the at least one server,
wherein the portable device receives the at least one content element by application software that is installed in the portable device if the application software is not installed in the portable device when the portable device accesses the at least one server,
wherein at least one provider of the at least one UID creates and manages the at least one content element in the server,
the at least one provider of the at least one UID customizes the application software for the UID,
the application software provides information of the portable device to the provider that customizes the application software when the portable device accesses the server, and
at least one user of the portable device updates the at least one content element in the server by using the application software.

2. The system of claim 1, wherein the server encrypts the at least one content element and transmits the encrypted content element to the portable device, and the portable device decrypts the encrypted content element by the application software.

3. The system of claim 1, wherein the server provides links of social networking sites (SNS) to the portable device when the portable device access to the server.

4. The system of claim 1, wherein the information of the portable device that is provided to the provider is at least one of a location, a time of access and an access history of the portable device.

5. The system of claim 4, wherein the at least one provider of the at least one UID provides, via the server, customized information to the portable device using the information of the portable device that is provided to the provider by the application software.

6. A method for mobile touchpoint solutions comprising:
reading, by a portable device, at least one radio frequency identification (RFID) tag;
decoding, by the portable device, at least one unique identifier (UID) of the at least one RFID tag;
accessing, by a portable device, at least one server that is indicated from the decoding of the at least one UID and storing at least one content element related with the at least one UID;
receiving, by a portable device, the at least one content element from the at least one server;
wherein the portable device receives the at least one content element from application software that is installed in the portable device if the application software is not installed in the portable device when the portable device accesses the at least one server,
at least one provider of the at least one UID creates and manages the at least one content element in the server,
the at least one provider of the at least one UID customizes the application software for the UID, the application software provides information of the portable device to the provider that customizes the application software when the portable device accesses to the server, and at least one user of the portable device updates the at least one content element in the server by using the application software.

7. The method of claim 6, wherein the server encrypts the at least one content element and transmits the encrypted content element to the portable device, and the portable device decrypts the encrypted content element by the application software.

8. The method of claim 6, wherein the server provides links of social networking sites (SNS) to the portable device when the portable device access to the server.

9. The method of claim 6, wherein the information of the portable device that is provided to the provider is at least one of a location, a time of access and an access history of the portable device.

10. The method of claim 9, wherein the at least one provider of the at least one UID provides, via the server, a customized information to the portable device by using the information of the portable device that is provided to the provider by the application software.

* * * * *